United States Patent

Garrett

[15] 3,683,189

[45] Aug. 8, 1972

[54] MEANS OF CANCELLATION OF THE EFFECT OF RANDOM DEVIATIONS IN RADIOACTIVE EMISSION UPON AN ANALOG D.C. VOLTAGE

[72] Inventor: Sheyrl W. Garrett, Tulsa, Okla.

[73] Assignee: Combustion Engineering, Inc., New York, N.Y.

[22] Filed: Nov. 13, 1969

[21] Appl. No.: 876,455

[52] U.S. Cl. ..........................250/83.6 R, 250/83.3 D
[51] Int. Cl. .................................................G01t 1/18
[58] Field of Search ...........250/83.3 R, 83.3 D, 83.6; 307/233; 328/140

[56] References Cited

UNITED STATES PATENTS 3,513,310   5/1970   Chope et al......250/83.6 W X
3,516,751   6/1970   Fruengel...........250/83.3 R X Primary Examiner—Archie R. Borchelt
Assistant Examiner—Davis L. Willis
Attorney—Arthur L. Wade

[57] ABSTRACT

A system is disclosed in which a source and detector of radiation are positioned to sense a physical property, the detector generating electrical pulses proportional to the energy of the source impinging thereupon. The circuitry of the system amplifies and shapes the pulses, converts them into an analog D.C. signal with A.C. components proportional to the frequency of the pulses, and amplifies the D.C. through A.C. and operational amplifiers to cancel the A.C. component and produce a pure analog D.C. output signal.

5 Claims, 5 Drawing Figures

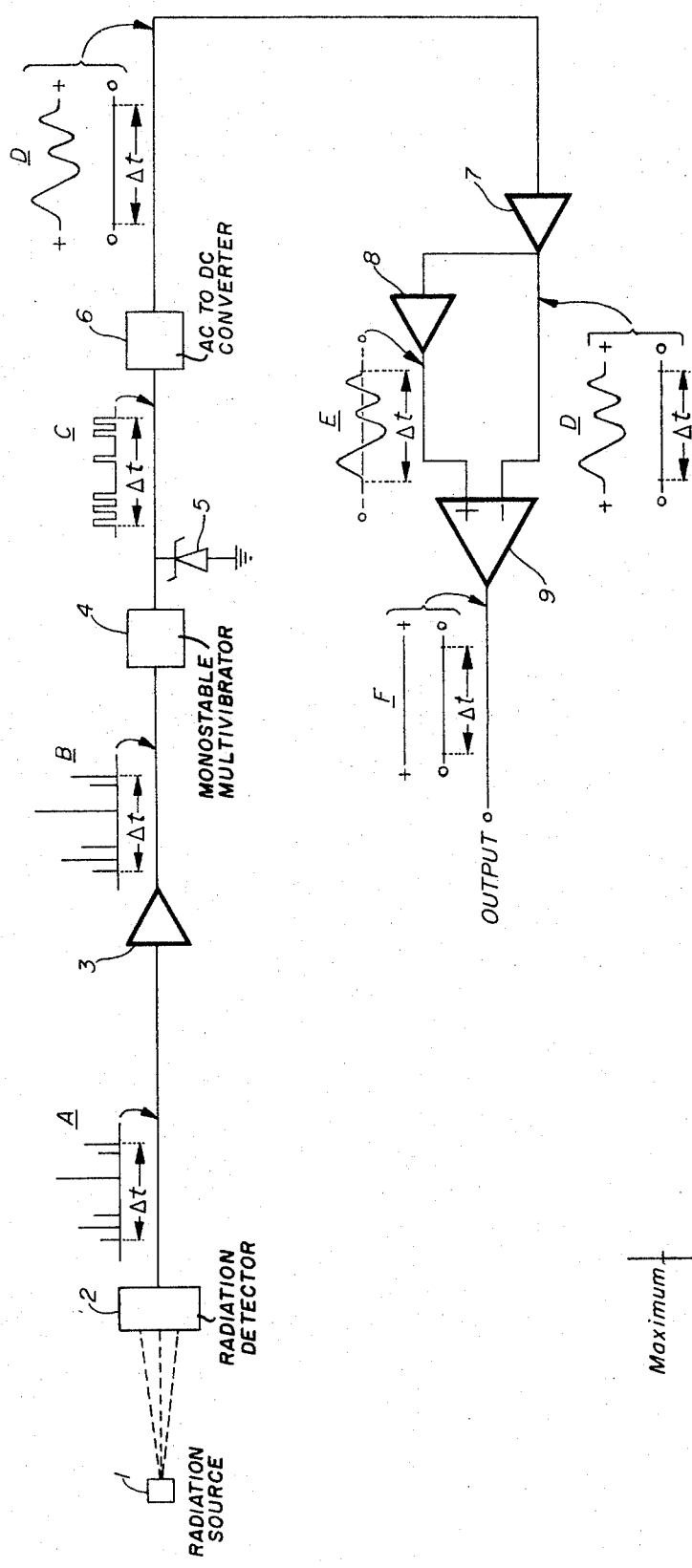
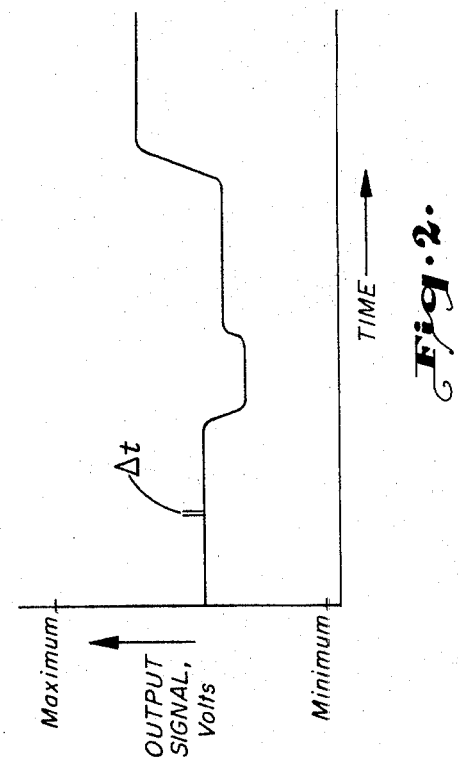

MEANS OF CANCELLATION OF THE EFFECT OF RANDOM DEVIATIONS IN RADIOACTIVE EMISSION UPON AN ANALOG D.C. VOLTAGE

BACKGROUND OF THE INVENTION

1. Field of the Invention

The present invention relates to the electrical manifestation of radioactive energy used in the sensing of physical properties. More particularly, the invention relates to use of a minimum strength radioactive source, a "proportional counter" type of detector, and circuitry whose output manifests the sensing function of source and detector by an analog D.C. voltage free of A.C. components introduced by the output of the detector.

2. Description of the Prior Art

To employ radioactive material in the manifestation of physical properties is well known. It is also well known to translate radioactive energy to electrical energy. In one common form, electrical energy impulses are generated by a detector in direct proportion to the level of radiation impingement thereupon. It is also known in the art to convert these pulses to a D.C. signal analogous to the physical property in question.

Common detectors of radiation are the "proportional counter," the Geiger-Mueller counter, the Geiger counter, and their equivalents. They are characterized as gas-filled vessels, conveniently of cylindrical shape, with a wire along the axis. The wire forms the anode and the cylinder wall the cathode. When a radiation particle enters the cylinder, it ionizes the gas and current flow results. Sufficient voltage is applied across the cylinder so that the ions produced by the radiation have enough energy to collide with other gas molecules and produce more ions which also collide and produce ions, so that an avalanche of electrons is collected at the anode. The voltage or current pulse is considerably amplified thereby. Hereafter in this disclosure, counters so characterized will be referred to simply as "proportional counters." They are distinguished from ion chamber and scintillation type counters.

When a relatively low energy source of radioactivity is used in conjunction with a proportional counter, it has previously been a problem to obtain an analog D.C. signal free of the A.C. component of the counter output. By the use of the terms herein "relatively low energy source," "low energy level source," and terms of like import, it is clearly understood by practitioners of the art that it is meant to use an energy source of such a level as will result in only a low energy level at the detector, and that the strength of the source in any given system is determined to be low or high always in reference to the absorptive, or shielding, characteristics of said given system. In other words, the energy of a source which is denominated low or high is so defined according to the quantity of its energy which reaches the detector after penetration of the given system, rather than by the absolute emissivity of the source without regard to said system. Specifically, if the energy present at the detector is equal to or less than 2 milliroentgens per hour, it is by definition a "low energy detection system" and the source is by definition referred to as a "low energy source." See AEC Regulations, Title 10, "Standards for Protection Against Radiation," at para. 20–103. The A.C. component is a function of the deviations in the quantity of emissions which impinge upon the counter with respect to time. These deviations in emissions impinging upon the counter constitute such a significant part of the average total emissions when a low energy source and proportional counter are used that, previous to this invention, changes in the physical property being observed were hidden by the deviations. In other words, the A.C. voltage is so large and erratic in proportion to the analog D.C. voltage that the analog D.C. value is obscured.

Standard electrical filters and integrators, such as a resistor-capacitor, are also known in the art to attenuate the A.C. component. However, they introduce of necessity a delay in the response time of the output curve. When a low energy source and proportional counter are used, the high degree of filtering required to remove a sufficient part of the A.C. from the analog signal introduces a response time delay of unacceptable duration.

SUMMARY OF THE INVENTION

The principal object of the invention is to utilize radioactive energy in the process control art in such a way that a physical property of a process is manifested by a D.C. signal that is free of A.C. components and analogous to the energy content of radiation received at a detector and thus the condition of the physical property, whereby the manifestation of the physical property is greatly improved.

Another object of the invention is to utilize radioactive source material of a low energy level to enhance the safety of applications.

Another object of the invention is to enable a relatively rugged proportional counter to be used as a detector to improve the economics of the system.

Another object of the invention is to minimize the response time of the pure analog D.C. signal to changes in the condition of the property so that such changes may be observed substantially at once.

The invention contemplates a low energy level source of radiation and a proportional counter that are responsive to a physical property, such as level, density, flow rate, interface, or other such properties which may be observed by radiation sensing techniques. Detector output is translated into A.C. pulses of equal time duration and equal amplitude in a conventional manner. An A.C. to D.C. converter produces a D.C. signal upon which the A.C. character of the pulses (specifically, their grouping, or density, with respect to incremental time) is necessarily impressed as a component thereof. This signal is then applied to an A.C. amplifier, the output of which reproduces the characteristics of the A.C. component of the D.C. input about a static voltage level, for example zero volts. The static level is the same for varying D.C. inputs. This output and the A.C. to D.C. converter output are summed algebraically by an operational amplifier. The effect is to cancel the A.C. component of the analog D.C. so that a pure analog D.C. signal remains which manifests the output of the detector.

Other objects, advantages and features of this invention will become apparent to one skilled in the art upon consideration of the written specification, appended claims, and attached drawings, wherein:

FIG. 1 is a block diagram representation of the components of a system in which the present invention is preferably embodied;

FIG. 2 is a graphical representation of the output of the system of FIG. 1 for various conditions of the property of the process;

Figure 3:
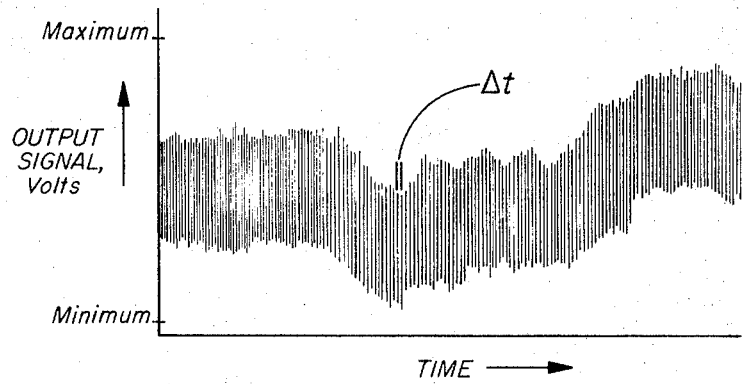
FIG. 3 is a graphical representation of the output of the system of FIG. 1 absent the novel filter means of the preferred embodiment.
Figure 4:
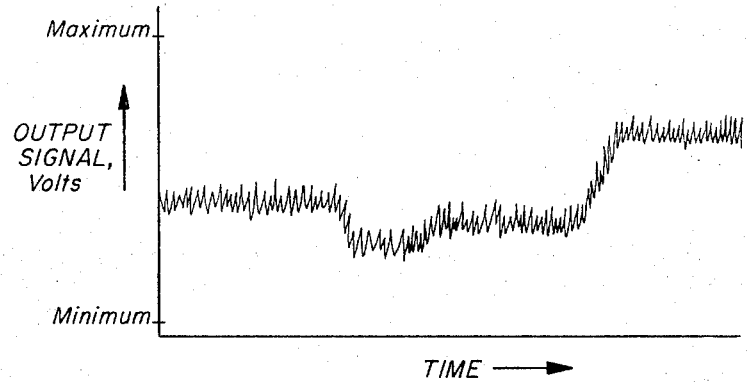
Figure 5:
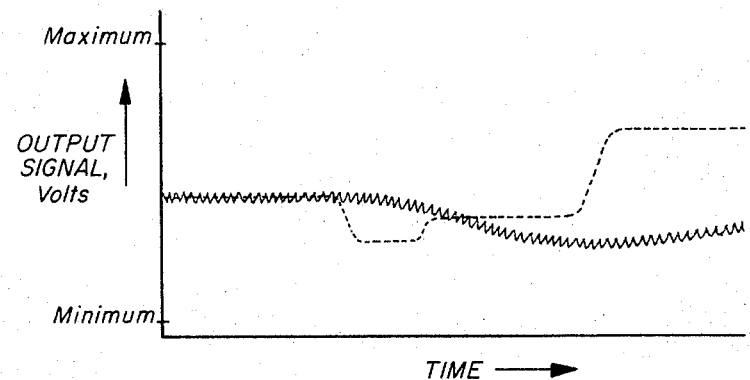

FIG. 4 is a graphical representation of the output of a system which electronically manifests the output of radiation sensing means comprised of a high energy level source of radiation with a proportional counter, or the ion chamber/scintillation counter type of detector means and a low energy source; and FIG. 5 is a graphical representation of the output of the system of FIG. 3, filtered by conventional means.

DESCRIPTION OF THE PREFERRED EMBODIMENT

1. The Operating Situation

In the operation of measurement, control, monitoring, and other process control functions by atomic radiation devices, certain important considerations are present, as discussed above. It is desirable from safety and cost standpoints to use a low energy (or low frequency) source, i.e. a source which emits a relatively small quantity of radioactive energy per unit of time. It is also desirable from an economic standpoint to use the relatively rugged and inexpensive proportional counter.

2. Sensing of the Process Property

Referring to FIG. 1, a relatively low level radioactive energy source 1 and proportional counter 2 are positioned in such a manner that the energy received at the counter varies as the condition of the process property varies. For example, fluid level in a tank might be subject to the emissions so that a higher fluid level would permit less energy to be detected at counter 2 than a lower level.

Counter 2 is positioned to intercept at least a portion of the radiation which passes through the process. Such energy as is received at the detector is converted to voltage pulses proportional thereto. These pulses are represented by sample wave form "A" in FIG. 1, which indicates the output pulses of detector 2 during an incremental time period, $\Delta t$.

When the level of energy received at the detector is high, many pulses will be present during $\Delta t$; when it is low, few will appear. It should be especially noted that whether many or few pulses occur during an increment of time, they will not be uniformly distributed across the increment. This phenomenon occurs because both the emission rate of the source and the density of emissions at all points about the source are not constant. Further, the emissions may vary in energy content (amplitude) as well.

These random variations in emission received at a detector increase as the energy level, or average rate of emission per unit of time (frequency), of the source decreases. Such variations also increase or decrease as the distance between source and detector increases or decreases. The larger the portion of the total source output that appears at the detector, the fewer the deviations from the average count. As an actual figure, the source need only supply approximately 0.25 mr/hr at counter 2 for the novel system disclosed to give satisfactory results.

FIGS. 3 and 4 depict the effect of the energy level of the source and/or the positioning of the detector. For example, FIG. 3 could be the detector output curve (sample wave form "D") when using a weak source, and FIG. 4 the detector output curve when using a high energy source. The deviations in FIG. 3 may easily be plus or minus 15 percent from the average count of the detector.

3. The Circuit

The voltage pulses of detector 2 are routinely amplified by amplifier 3. They are then shaped and clipped in a well known manner by a component of the circuit such as the monostable multivibrator 4 and zener diode 5. Sample wave forms "B" and "C" illustrate these functions. Voltage pulses of constant amplitude and equal time duration which retain the same distribution in time as the pulses of the detector are produced.

These pulses are then converted to a D.C. signal by an A.C. to D.C. converter 6. Such a converter is well known in the electrical arts, and accordingly not shown in circuit detail. The output of converter 6 is a D.C. signal corresponding to the number of pulses in $\Delta t$, with an A.C. component corresponding to the distribution of pulses in $\Delta t$.

It is apparent from the above that the D.C. signal strength is proportional to the average number of pulses in $\Delta t$. It may also be seen that the character of the A.C. component of the D.C. signal is due to the spacing, or density, of the voltage pulses within time $\Delta t$, which are themselves due in turn to the deviations in the emissions impinging upon the detector. Sample wave form "D" depicts the D.C. signal with its A.C. component. Note that the grouping in form "C" of the pulses determines the amplitude of the A.C. in form "D." Note also that the scale of the abscissae of the sample wave forms is expanded for clarity of presentation. A comparison of this curve of $\Delta t$ with the variations of the counter 2 output signal over a reasonable range of process variation may be had by referring to FIG. 3, where $\Delta t$ is seen as an increment of total time.

The converter output is then applied through buffer amplifier 7 to an A.C. amplifier 8. This component of the circuit cannot pass the D.C. portion of converter 6, but does reproduce the A.C. component about a fixed static voltage level, or carrier voltage. Sample wave form "E" depicts the output of A.C. amplifier 8, where the static level voltage upon which the A.C. component is reproduced is zero volts. If the static voltage were a positive value, it would only be necessary to calibrate the circuit output when it was applied to a counter or other manifesting means. It is noted that the A.C. amplifier may be any one of several types; such amplifiers are well known in the art and therefore not shown in circuit detail.

Converter 6 output is also applied at one input of an operational amplifier 9. The output of the A.C. amplifier 8 is applied to the other input. The inputs of amplifier 9 are inverting and non-inverting, and thus the effect of the summation of the converter 6 and amplifier 8 outputs is to cancel the A.C. component. Sample wave form "F" depicts the output of amplifier 9 for incremental time $\Delta t$. It is thus seen that the output of the circuit which manifests the detector 2 output is a pure D.C. signal analogous to the condition of the physical property being sensed.

4. The Novel Structure Compared

The graphical representations of FIGS. 2–5 illustrate the outputs of various detector circuits discussed in the foregoing.

FIG. 2 depicts the output of the novel circuit of the system FIG. 1 over a reasonable range of process variation. The various output levels of the curve signify the various conditions of the process property. The maximum-minimum points on the ordinate signify the operative range of the detection apparatus. For example, the curve might represent a fluid level in a tank, and indicate four levels during the observation time (for instance, 2 hours). The maximum output point of the ordinate would then represent maximum radiation at the detector and thus minimum fluid level in the tank. The output is a pure D.C. signal analogous to the property manifested. An increment of the output of FIG. 2 during time $\Delta t$ is represented in FIG. 1 by sample wave form "F."

FIG. 3 depicts the output of a detection system employing a low energy source and proportional counter without the circuitry of the invention. It might also represent a system using a proportional counter positioned to detect only a very small percent of the total output of a stronger source, also absent the novel circuitry. As described, the A.C. character of the detector voltage pulse is such that changes in the property desired to be observed are hidden.

FIG. 4 depicts the output of a detection system in which a high level of radiation energy appears at the detection means. Due to the nature of the radiation phenomenon itself, it is obvious that deviations in the emission rate constitute a lesser portion of the total emissions, and the desired observations may be made. The dangers, cost, and other negative considerations in the use of high energy level source materials are apparent.

FIG. 5 compares the output of the novel system with the output of a system employing conventional filter means, such as a resistor-capacitor network designed to suppress (or filter) the A.C. component from the signal illustrated in FIG. 3 and wave form "D" in FIG. 1. It is seen that response time of the output curve may be excessive for certain applications; for example, a tank may overflow before it is clear from the curve that an overflow condition exists. Such filters are used in certain hydrocarbon refinery processes where rapid changes do not occur and immediate responses are not required.

5. Response Time Considerations

It is stressed that the invention employs not only low energy source means and rugged inexpensive detector means, and produces a pure analog signal therefrom, but also that it preserves a substantially immediate response in output to any change in the property of the process being observed. Conventional filters can also produce a substantially pure analog D.C. signal from equivalent source and detector means, but introduce response time delays which render them impractical. This point is illustrated, as described above, in FIG. 5. To reduce the response time delay of a conventional filter, it was previously required to increase the radiation energy at the detector, or employ the more expensive and less rugged form of detector. The invention is seen to employ only minimal radiation energy, the more desirable form of detector, and preserve a substantially immediate output response time.

6. Summary

The concept of the invention is seen in the preferred embodiment to provide a solution to certain problems inherent in the electrical manifestation of radioactive energy. An analog D.C. signal is used to indicate a condition with great accuracy, and to reflect substantially at once even small changes in the condition.

From the foregoing it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system which generates a D.C. signal proportional to an amount of radioactive energy present at a radiation detector means, including, radiation source and detector means, said detector means arranged to sense the amount of radioactive energy impinging thereupon and to generate electrical pulses proportional thereto, means connected to the detection means to modify the electrical pulses such that each pulse is of equal magnitude and equal time duration, an A.C. to D.C. converter connected to the electrical pulse modifying means to convert the pulses to a D.C. signal having an A.C. component, an A.C. amplifier connected to the A.C. to D.C. converter which produces a D.C. voltage of a predetermined static level and reproduces the A.C. component of the D.C. signal of the converter upon the static D.C. of the A.C. amplifier, and an operational amplifier, one input of which is connected to the A.C. to D.C. converter and one input of which is connected to the A.C. amplifier, to which inputs the A.C. to D.C. converter signal and the signal from the A.C. amplifier are applied to be algebraically summed, whereby the A.C. component of the converter signal is cancelled and a pure D.C. signal analogous to the radiation present at the radiation detector means is produced as the output of the operational amplifier.

2. A system which generates an analog D.C. voltage proportional to an amount of radioactive energy present at a radiation detector means, including, a source of radioactivity, means positioned relative to the source to detect the emission from the source, said source and detection means being arranged so that the amount of radioactivity present at the detecting means is proportional to the degree of shielding rendered by a condition of the process susceptible to being sensed by such source and detector means, means connected to the detection means to modify the pulses such that each pulse is of equal magnitude and equal time duration, an A.C. to D.C. converter connected to the modifying means to convert the pulses to a D.C. signal analogous to the condition of the property and necessarily containing an A.C. component proportional to the inherent deviations in the emission impinging upon the detection means, an A.C. amplifier at which the A.C. to D.C. converter signal is applied to produce a D.C. signal of a predetermined static level and to reproduce the A.C. component of the D.C. signal of the converter upon the static D.C. of the A.C. amplifier, and an operational amplifier to one input of which the A.C. to D.C. converter signal is applied and to another input of which the A.C. amplifier signal is applied, the signals thus being algebraically summed, whereby the A.C. component of the D.C. signal from the converter is cancelled and a pure D.C. signal is produced as the output of the system.

3. The system of claim 2 in which the source of radioactivity is of an energy level such that the radiation energy present at the detector is equal to or less than 2 milliroentgens per hour.

4. The system of claim 2 in which the radiation detection means is a detector of the proportional counter type.

5. The system of claim 2 in which the detector means is a Geiger-Mueller counter.

* * * * *